United States Patent [19]
Kachalova et al.

[11] 3,872,216
[45] Mar. 18, 1975

[54] METHOD FOR PRODUCING PHOSPHATE CATALYST

[76] Inventors: Revekka Vulfovna Kachalova, ulitsa Krylenko, 5, kv. 194; Mark Semenovich Nemtsov, prospekt Gagarina, 21, kv. 8; Galina Fedorovna Balkhanova, ulitsa Telmana, 48, korpus 3, kv. 60, all of Leningrad, U.S.S.R.

[22] Filed: July 17, 1972

[21] Appl. No.: 272,622

[52] U.S. Cl.............. 423/313, 252/437, 260/680 R
[51] Int. Cl. ..................... C01b 25/26, C01b 15/16
[58] Field of Search ........................... 423/304–313; 252/437

[56] References Cited
UNITED STATES PATENTS
2,890,241   6/1959   Holmen et al. ..................... 252/437
3,294,486   12/1966  Cremer et al. ..................... 423/309

FOREIGN PATENTS OR APPLICATIONS
962,182   7/1964   United Kingdom .............. 423/311

OTHER PUBLICATIONS
A Reference Precipitated Tricalcium Phosphate Hydrate, MacIntire Industrial and Engineering Chemistry, Vol. 37, Feb. 1945, p. 164–169.

A Basic Phosphate of Calcium and of Strontium, Lorch et al., J.A.C.S., April, 1929, p. 1097–1106, Vol. 51.

*Primary Examiner*—O. R. Vertiz
*Assistant Examiner*—Gregory A. Heller

[57] ABSTRACT

A method for producing a phosphate catalyst useful for selective rupturing of

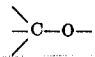

bonds in organic solvents, and, in particular, for splitting 4,4-dimethyl-1,3-dioxane into isoprene, by precipitating tertiary phosphates of Group II metals from aqueous solutions of salts of Group II metals and water-soluble salts of phosphoric acid, preferably of calcium, in the presence of excess ammonia in an amount of from 20 to 50 molar %, and preferably of 30 molar per cent per anion of phosphoric acid in the phosphate at a temperature not exceeding 25°C., one of about 20°C.

4 Claims, No Drawings

METHOD FOR PRODUCING PHOSPHATE CATALYST

The present invention relates to the production of isoprene from isobutylene and formaldehyde, and more particularly to the methods for producing phosphate catalysts for selective rupturing of

bonds in organic compounds, particularly for splitting 4,4-dimethyl-I,3-dioxane, further referred to as DMD, into isoprene.

The known catalysts employed for this purpose, in particular, the known calcium phosphate catalysts used in the production of isoprene, are prepared by precipitation, preferably from equimolar aqueous solutions containing a calcium salt, and sodium and ammonium phosphates.

However, the precipitated calcium phosphate thus obtained is actually a mixture of acid and basic salts of a variable chemical and phase composition, since in the process of precipitation the pH of the solution changes within a wide range.

Accordingly, though the analytically determined average composition of the entire precipitate thus obtained approaches that of a tertiary phosphate — $Ca_3(PO_4)_2$, the catalytic properties and mechanical strength of the produced catalyst are, however, often irreproducible, this resulting in frequent difficulties arising in the process of its commercial application.

It is an object of this invention to provide a method for the production of a phosphate catalyst of the type described, which would be free from the above-stated disadvantages.

This and other objects have been attained by a method of producing tertiary phosphates of Group II metals, useful as catalysts for selective rupturing of

bonds in organic compounds, particularly for splitting 4,4-dimethyl-1,3-dioxane into isoprene and for dehydration of alcohols, by means of precipitating tertiary phosphates of Group II metals from aqueous solutions of neutral salts thereof and water-soluble salts of phosphoric acid, followed by separation of the precipitate, washing and preparation of a granulated catalyst from the paste thus obtained, the process of precipitation according to the present invention being carried out in the presence of excess ammonia sufficient to ensure that the solution pH does not fall below 9.0 during the entire period of precipitation. Thus, sufficient ammonia, under these circumstances, is not merely that amount which ensures a stoichiometric ratio of base and acid for production of the desired tertiary phosphate but rather a 20 to 50 molar percent excess relative to the amount of anion of phosphoric acid in the final phosphate product. For example, to illustrate this point further, consider the following equation: $3CaCl_2 + 2\ Na_2HPO_4 + 2NH_3 \rightarrow Ca_3(PO_4)_2 + 4NaCl + 2NH_4Cl$; when effecting this precipitation reaction, in accordance with the present invention, 1.3 moles, and not one mole, of $NH_3$ is introduced into the reaction solution per mole of $Na_2HPO_4$.

The tertiary phosphate thus produced contains minimum amounts of acid forms and its analytically determined molar ratio of CaO is: $P_2O_5 \geq 2.95$, i.e., a value which is sufficiently close to the theoretical one for $Ca_3(PO_4)_2$, in which $CaO : P_2O_5 = 3$.

The effect of the amount of ammonia in the solution on the composition and the properties of the precipitated calcium phosphate are shown in the Table.

Table

The Effect of Amounts of Ammonia in Solution on Composition and Properties of Precipitated Calcium Phosphate

| Excess amount of $NH_3$ in mole % per anion of phosphoric acid | Solution pH during precipitation | | Characteristics of catalyst | | | |
|---|---|---|---|---|---|---|
| | Range of pH values | ΔpH | Molar ratio $CaO/P_2O_5$ | Bulk weight, kg/l | Cleavage strength of granules, kg/cm | Duration of washing of precipitate, min |
| −80[*] | 5.4–7.6 | 2.2 | 2.70–2.79 | 0.23–0.25 | 0–1.0 | 6–8 |
| −10[*] | 5.7–7.7 | 2.0 | 2.79–2.85 | 0.60–0.65 | 1.2–1.7 | 8–9 |
| 0[**] | 6.9–8.7 | 1.8 | 2.90–2.94 | 0.68–0.71 | 14–16 | 12–69 |
| +10 | 8.5–9.1 | 0.6 | 2.92 | 0.68 | 16 | 28 |
| +20 | 8.9–9.2 | 0.3 | 2.95 | 0.71 | 15 | 35 |
| +30 | 9.0–9.2 | 0.2 | 2.95–3.00 | 0.72–0.75 | 14–16 | 38 |
| +50 | 9.2–9.3 | 0.1 | 2.97 | — | 15 | 46 |
| +200 | 9.9–10.0 | 0.1 | 3.00 | 0.74 | 14 | 150 |
| +400 | 10.0–10.2 | 0.2 | 2.98 | 0.74 | 15 | 200 |

Notes:
[*] — The initial amount of cations is 20 and 10% lower than that of phosphoric acid anion.
[**] — Stoichiometric cation/anion ratio.

As can be seen from the Table, the value of the said molar ratio is not only not attained when there is a shortage of cations relative to anions or when they are in a stoichiometric ratio, but also with a 10% excess of ammonia, when fluctuations of pH (columns 2 and 3 in the Table) in the process of precipitation still remain considerable.

The stabilization of pH and, correspondingly, of the composition and properties of the phosphate produced, can only be achieved with excess ammonia of not less than 20 to 30% of the mole per anion of phosphorus acid ($PO_4\equiv$) (columns 4 to 7 in the Table).

On the other hand, with an excess of ammonia exceeding 50%, although the $CaO : P_2O_5$ ratio remains practically at the same comparatively high level, the degree of precipitate dispersion keeps on increasing, which makes essentially more difficult the preparation of the catalyst since the duration of the filtering and washing operations is strongly increased (column 7 in the Table).

Accordingly, for the purpose of preparing the catalyst to be employed on an industrial scale, it is recommended that the precipitation be carried out with excess ammonia lying within a range of from 20 to 50% mole per anion of phosphorus acid included.

By means of the present invention, not only is the production of a phosphate having an average molar ratio of $CaO:P_2O_5$ not lower than 2.95 ensured, but the granulated catalyst thus produced also exhibits high catalytic activity and selectivity, the predetermined properties being well reproducible in the process of the catalyst manufacture.

Another important condition which determines the quality of the catalyst is the temperature at which it is precipitated and washed; the temperature should be maintained not over 25°C, preferably within the range of 18 to 22°C. The authors of the present invention have found that at higher temperatures the mechanical strength of the catalyst sharply decreases due to the formation of a precipitate having large-crystalline structure. On the other hand, at considerably lower temperatures, the duration of filtration and washing of the catalyst increases.

The following example serves to illustrate the essence of the present invention.

Example 1.07 m³ of calcium chloride solution of 100 kg/m³ concentration, and 1.89 m³ of an ammoniacal solution of sodium-ammonium phosphate containing 48.42 kg/m³ $Na_2HPO_4$ and 7.5 kg/m³ $NH_3$ are gradually poured into a vessel provided with a stirrer. The blending is carried out for 2 hours, with the suspension being continuously stirred. Precipitation is carried out at a temperature of 20° to 21°C.

The process yields 100 kg of the catalyst, which is further filtered and washed with water until the chloride ion content in the wash water is 0.5%. The resulting paste is shaped into noodles 4 mm in dia and dried at 120°C for 4 hours. The characteristics of the catalyst thus prepared are as follows.

Molar ratio of $CaO : P_2O_5 = 2.98$
Bulk weight, 0.70 kg/l
Cleavage strength, 16.1 kg/cm The process of splitting DMD with the catalyst obtained is carried out at a temperature of 375°C, with a DMD space velocity of 0.7 v/v cat.hr and dilution with steam in a weight ratio of $DMD : H_2O = 1 : 2$; the duration of the working period being 3 hours, followed by oxidative regeneration of the catalyst. During the working period the catalyst is continuously made-up with phosphoric acid, fed in a quantity of 0.01% by weight of the DMD supplied.

The degree of conversion the latter, as well as of the unsaturated alcohols $C_5H_9OH$, forming as intermediate products of decomposition of DMD and being dehydrated with the same catalyst at a high speed into isoprene, totals 96%, with the isoprene yield being 87 mol percent for the converted DMD and unsaturated alcohols.

Under industrial conditions, the total operating life or duration of the catalyst, with scarcely a decrease in its activity and selectivity, is 1,600 hours.

What we claim is:

1. A method for producing tertiary phosphates of Group II metals, useful as a catalyst for selective rupturing of

bonds in organic compounds, and, in particular, for splitting 4,4-dimethyl-1,3-dioxane into isoprene and for dehydration of alcohols, comprising reacting, at a temperature not exceeding 25°C., an aqueous solution of a salt of a Group II metal and a water-soluble salt of phosphoric acid in the presence of an amount of ammonia exceeding the stoichiometric amount required for the formation of tricalcium phosphate by 20–50 mole % per anion of phosphoric acid incorporated therein; and recovering the resulting tertiary phosphate.

2. A method as claimed in claim 1, wherein the resulting tertiary phosphate is tertiary calcium phosphate.

3. A method as claimed in claim 1, wherein the amount of ammonia exceeding the stoichiometric amount required is 30 mole % per anion of phosphoric acid incorporated therein.

4. A method as claimed in claim 1, wherein the tertiary phosphate is percipitated at a temperature of from 18° to 22°C.

* * * * *